(12) United States Patent
Chen

(10) Patent No.: US 9,958,738 B2
(45) Date of Patent: May 1, 2018

(54) LIQUID CRYSTAL DISPLAY PANEL AND DISPLAY DEVICE

(71) Applicant: Shenzhen China Star Optoelectronics Technology Co., Ltd., Shenzhen, Guangdong (CN)

(72) Inventor: Caiqin Chen, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days. days.

(21) Appl. No.: 14/418,175

(22) PCT Filed: Jan. 16, 2015

(86) PCT No.: PCT/CN2015/070918
§ 371 (c)(1),
(2) Date: May 9, 2016

(87) PCT Pub. No.: WO2016/086520
PCT Pub. Date: Jun. 9, 2016

(65) Prior Publication Data
US 2016/0246134 A1 Aug. 25, 2016

(30) Foreign Application Priority Data
Dec. 2, 2014 (CN) .......................... 2014 1 0722723

(51) Int. Cl.
*G02F 1/1343* (2006.01)
*G02F 1/1362* (2006.01)
*G09G 3/36* (2006.01)

(52) U.S. Cl.
CPC .. *G02F 1/134336* (2013.01); *G02F 1/136286* (2013.01); *G09G 3/3607* (2013.01); *G02F 2001/134345* (2013.01); *G02F 2201/52* (2013.01); *G09G 3/3614* (2013.01); *G09G 2300/0413* (2013.01); *G09G 2300/0426* (2013.01); *G09G 2300/0452* (2013.01); *G09G 2320/0209* (2013.01)

(58) Field of Classification Search
CPC ... G09G 2300/0426; G09G 2300/0413; G09G 2320/0209; G09G 3/3614; G09G 2300/0452; G09G 3/3607; G02F 1/136286; G02F 1/134336; G02F 2001/134345; G02F 2201/52
See application file for complete search history.

(56) References Cited

U.S. PATENT DOCUMENTS

2011/0234655 A1   9/2011   Tzeng et al.

FOREIGN PATENT DOCUMENTS

| CN | 101430853 A | 5/2009 |
|---|---|---|
| CN | 101950539 A | 1/2011 |
| CN | 102368125 A | 3/2012 |
| CN | 104036750 A | 9/2014 |
| CN | 104062792 A | 9/2014 |
| KR | 1020070080427 A | 8/2007 |

OTHER PUBLICATIONS

International Search Report and Written Opinion, dated Jan. 16, 2015, China.

*Primary Examiner* — Abhishek Sarma
(74) *Attorney, Agent, or Firm* — Kim Winston LLP

(57) ABSTRACT

A liquid crystal display panel, comprising a plurality of pixel units arranged as an array. Each pixel unit comprises at least three sub pixels respectively of different colors. Sub pixels of a same color in two longitudinally adjacent pixel units have different brightness under a same gray scale.

8 Claims, 6 Drawing Sheets

LIQUID CRYSTAL DISPLAY PANEL AND DISPLAY DEVICE

The present application claims benefit of Chinese patent application CN201410722723.2, entitled "A Liquid Crystal Display Panel and A Display Device" and filed on Dec. 2, 2014, the entirety of which is incorporated herein by reference.

TECHNICAL FIELD

The present disclosure relates to the technical field of display, and in particular to a liquid crystal display panel and a display device.

TECHNICAL BACKGROUND

Figure 1:
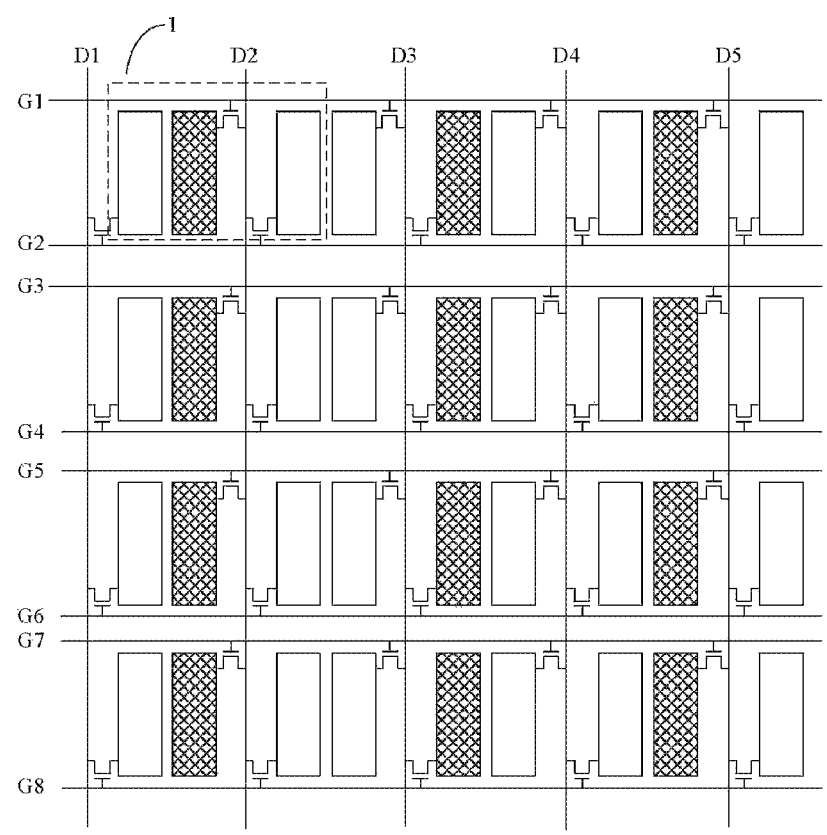

In the prior art, every two horizontally adjacent sub pixels in a half source driving (HSD) pixel array share a data line, as shown in FIG. 1. For example, a second sub pixel and a third sub pixel in a first pixel unit row share a data line D2, and a fourth sub pixel and a fifth sub pixel therein share a data line D3. In this case, the number of data lines can be reduced by half as compared with a traditional liquid crystal drive pixel array. Adjacent sub pixels in a same row are connected with different gate lines, and every other sub pixel therein is connected with the same gate line. For example, the second sub pixel and the fourth sub pixel in the first pixel unit row are connected with a gate line G1, and the third sub pixel and the fifth sub pixel therein are connected with a gate line G2. In this case, two longitudinally adjacent sub pixels are connected with different gate lines. However, the above arrangements cause the number of gate lines to double as compared with the traditional drive pixel array.

Figure 2:
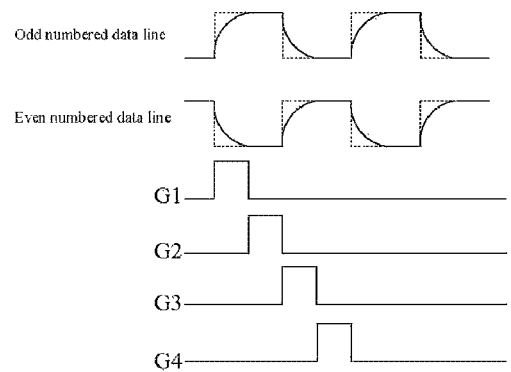
Figure 3:
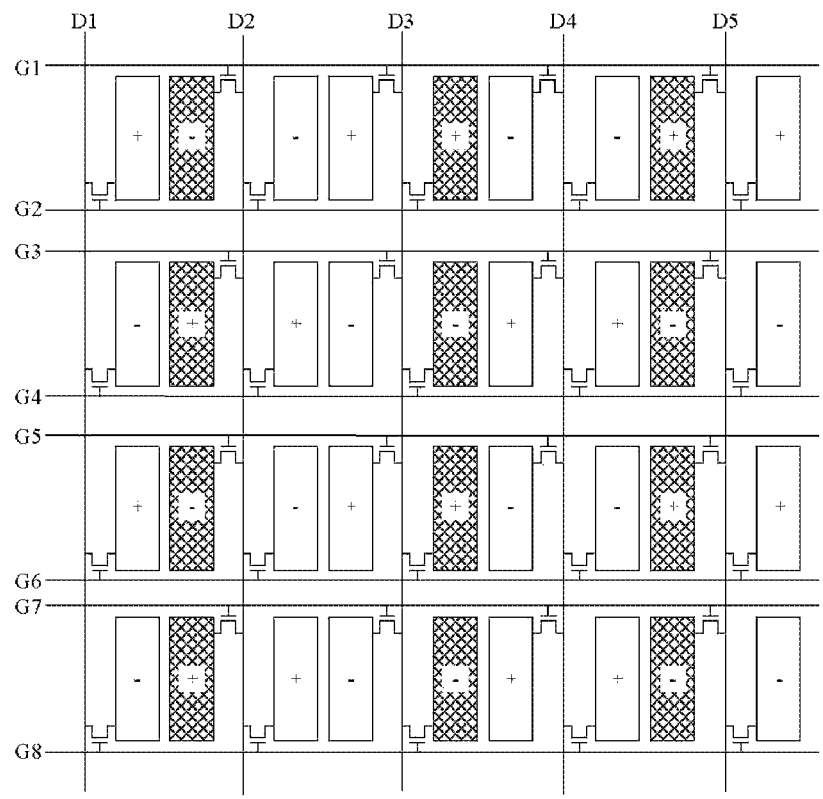

Take a two-dot inversion drive mode of a data signal as an example, in an HSD pixel array, the corresponding situation between the data signal and a drive signal of the gate line is as shown in FIG. 2. Because the number of gate lines doubles, the scanning time distributed to each gate line is reduced, whereby the time for charging the sub pixels is reduced. As shown in FIG. 3, a high level signal of the data line usually charges two columns of sub pixels on both sides of the data line simultaneously. In the meantime, because the sub pixels in the two columns are respectively connected with different gate lines, the two columns of sub pixels are driven in a chronological order. In other words, the high level signal charges an odd numbered column of sub pixels during the first half time, and an even numbered column of sub pixels during the latter half time.

The inventor found out that due to certain resistance of the data line, delay distortion would occur to the waveform of the data signal during transmission, causing distortion of data signal of both even numbered and odd numbered data lines. Specifically, as shown in FIG. 2, the ideal waveform of the data signal is a rectangular wave (dashed line as shown in FIG. 2). However, due to the influence of the delay distortion, the data signal rises slowly for the first half time of the waveform, and reaches a pre-determined voltage value until the latter half time of the same waveform. In this case, the charge volume of sub pixels driven by odd numbered gate lines during the first half time of the waveform is lower than that of the sub pixels driven by the odd numbered gate lines during the latter half time of the waveform. Consequently, the sub pixels driven first are undercharged, thus have relatively low brightness. By contrast, sub pixels driven later are better charged, thus have relatively high brightness. In view of FIGS. 1 and 2, sub pixels driven by even numbered gate lines are in the same column, and sub pixels driven by odd numbered gate lines are in the same column. As a result, bright lines and dark lines would appear on the entire HSD pixel array.

Based on the foregoing, a display panel which can eliminate the defect of bright lines and dark lines of the HSD pixel array is needed.

SUMMARY OF THE INVENTION

The objective of the present disclosure is to provide a liquid crystal display panel and a display device, so that the technical problem of bright lines and dark lines of an HSD pixel array can be eliminated.

In a first aspect according to the present disclosure, a liquid crystal panel is provided, comprising a plurality of pixel units arranged as an array, wherein each pixel unit comprises at least three sub pixels respectively of different colors, and sub pixels of a same color in two longitudinally adjacent pixel units have different brightness under a same gray scale.

Further, sub pixels of the same color in two longitudinally adjacent pixel units are disposed in different columns.

Further, every two continuous pixel unit rows form a cycle, in which a second pixel unit row is staggered to the right relative to a first pixel unit row for a distance of one sub pixel.

Further, the first pixel unit row comprises no dummy sub pixel at a left side thereof, and a first sub pixel at a left side of the second pixel unit row is a dummy sub pixel.

Further, a first sub pixel at a right side of the first pixel unit row is a dummy sub pixel, and the first sub pixel at the left side of the second pixel unit row is a dummy sub pixel.

Further, every three continuous pixel unit rows form a cycle, in which a second pixel unit row is staggered to the right relative to a first pixel unit row for a distance of one sub pixel, and a third pixel unit row is staggered to the right relative to the second pixel unit row for a distance of one sub pixel.

Further, the first pixel unit row comprises no dummy sub pixel at the left side thereof, the first sub pixel at the left side of the second pixel unit row is a dummy sub pixel, and both a first sub pixel and a second sub pixel at a left side of the third pixel unit row are dummy sub pixels.

Further, both the first sub pixel and a second sub pixel at the right side of the first pixel unit row are dummy sub pixels, a first sub pixel at a right side of the second pixel unit row is a dummy sub pixel, and the third pixel unit row comprises no dummy sub pixel at a right side thereof.

Further, the sub pixels in a same pixel unit are respectively red, green, and blue from left to right.

The present disclosure has the following beneficial effects. A liquid crystal display panel is provided according to the present disclosure, wherein sub pixels of the same color in two longitudinally adjacent pixel units have different brightness under a same gray scale. In this case, light coming from the sub pixels in the two longitudinally adjacent pixel units, with the same color but different brightness, are complementary to each other. As a result, the liquid crystal display panel can emit uniform light as a whole, whereby the defect of bright lines and dark lines can be eliminated, and the user experience can be improved.

In a second aspect according to the present disclosure, a display device is provided, comprising the abovementioned liquid crystal display panel.

Other features and advantages of the present disclosure will be further explained in the following description and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE ACCOMPANYING DRAWINGS

Figure 4:
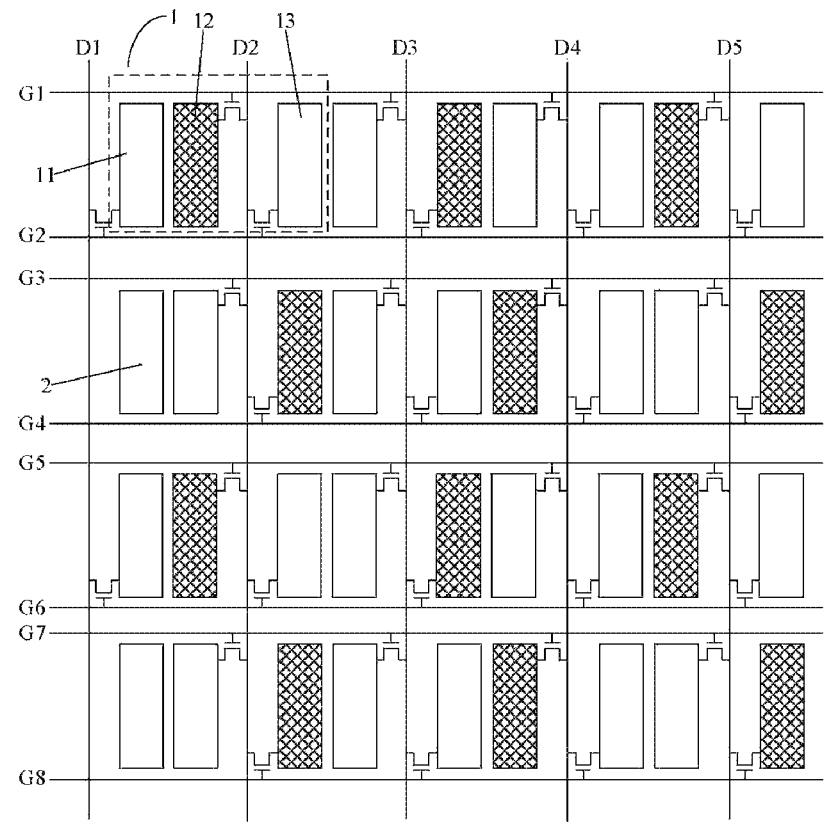
Figure 5:
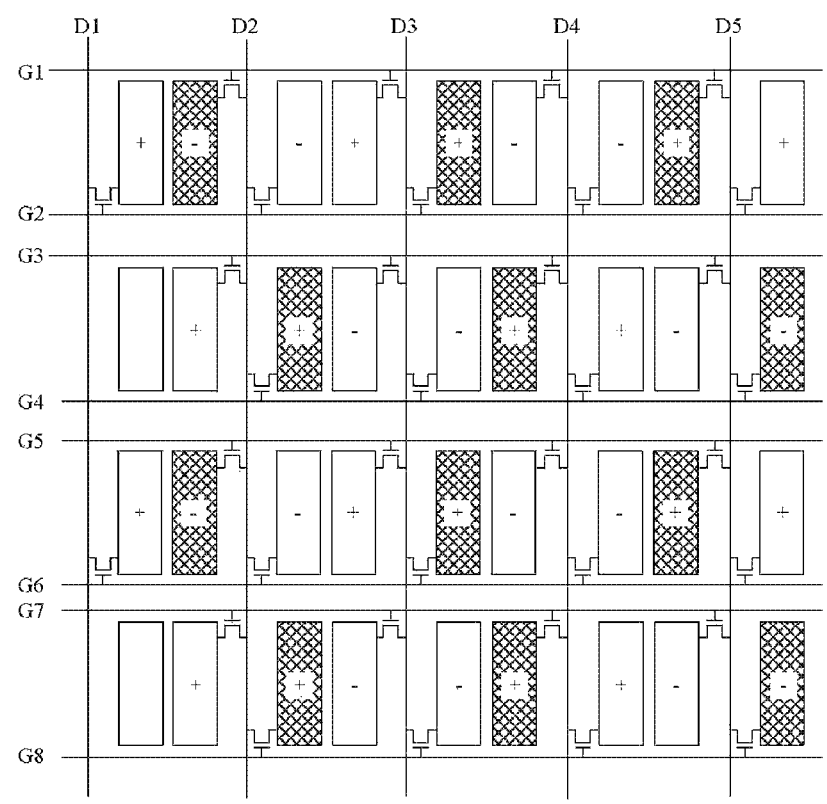
Figure 6:
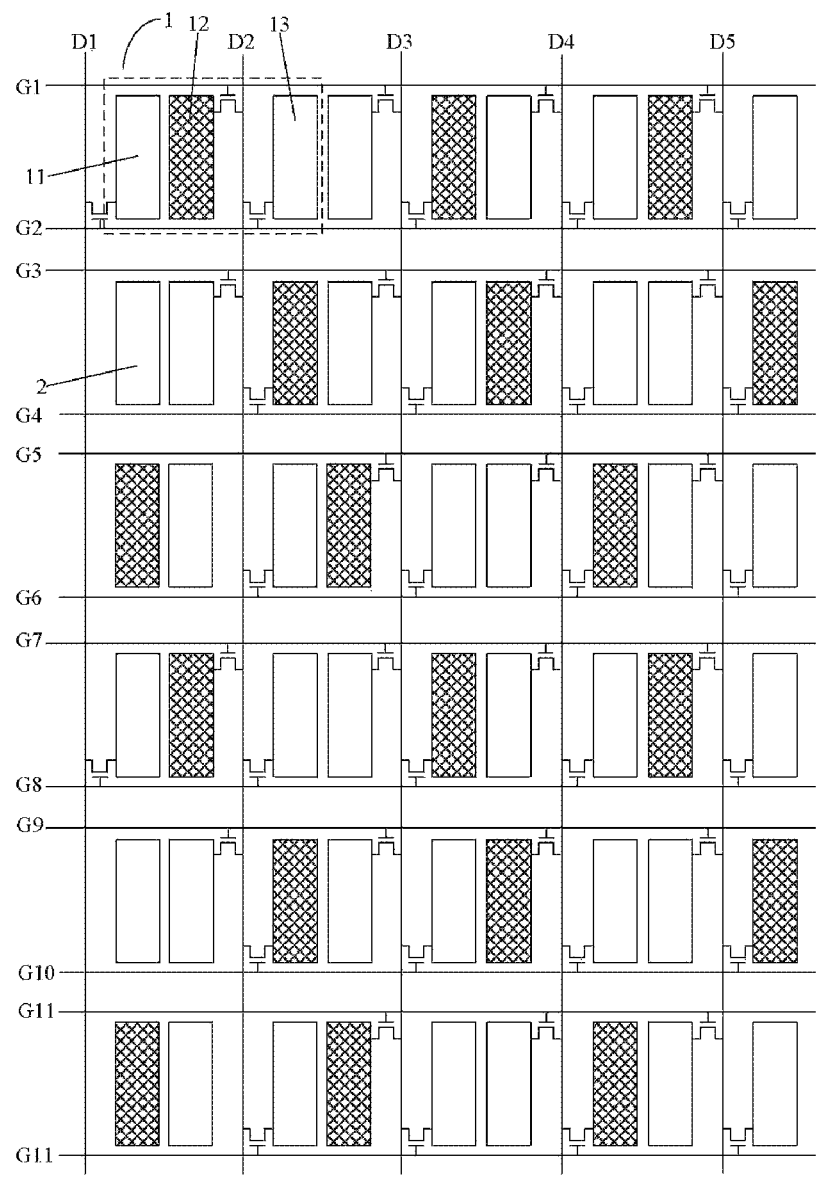
Figure 7:
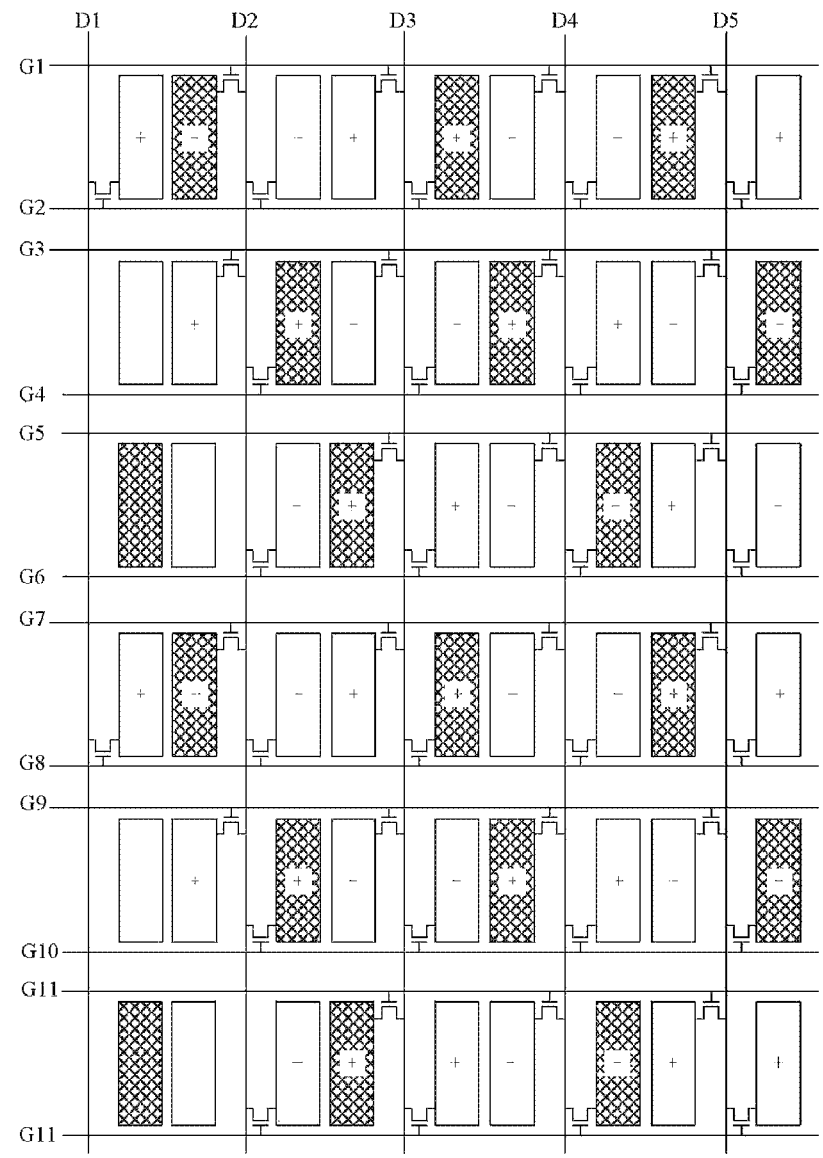

In order to illustrate the technical solutions of the examples of the present disclosure more clearly, the accompanying drawings needed for describing the examples will be explained briefly. In the drawings:

FIG. 1 schematically shows a structure of a liquid crystal display panel in the prior art, FIG. 2 shows a drive waveform of the liquid crystal display panel, FIG. 3 shows a charging effect of FIG. 1, FIG. 4 shows a structure of a liquid crystal display panel according to an example of the present disclosure, FIG. 5 shows a charging effect of FIG. 4, FIG. 6 shows another structure of the liquid crystal display panel according to the example of the present disclosure, and FIG. 7 shows a charging effect of FIG. 6.

DETAILED DESCRIPTION OF THE EMBODIMENTS

The present disclosure will be explained in detail with reference to the examples and the accompanying drawings, whereby it can be fully understood how to solve the technical problem by the technical means according to the present disclosure and achieve the technical effects thereof, and thus the technical solution according to the present disclosure can be implemented. It is important to note that as long as there is no structural conflict, all the technical features mentioned in all the examples may be combined together in any manner, and the technical solutions obtained in this manner all fall within the scope of the present disclosure.

A liquid crystal display panel is provided according to an example of the present disclosure, comprising a plurality of pixel units 1 arranged as an array. Each pixel unit comprises at least three sub pixels of different colors. Sub pixels of a same color in two longitudinally adjacent pixel units 1 have different brightness under a same gray scale.

According to the present disclosure, a liquid crystal display panel is provided. Sub pixels of the same color in two longitudinally adjacent pixel units have different brightness under the same gray scale. In this case, light coming from the sub pixels in the two longitudinally adjacent pixel units, with the same color but different brightness, are complementary to each other. As a result, the liquid crystal display panel can emit uniform light as a whole, whereby the defect of bright lines and dark lines can be eliminated, and the user experience can be improved.

Further, in order to eliminate the defect of bright lines and dark lines in the liquid crystal display panel, in an example according to the present disclosure, sub pixels of the same color in two longitudinally adjacent pixel units can be disposed in different columns. Such alteration of structure can be implemented through the following manners.

As shown in FIG. 4, in the liquid crystal display panel, each pixel unit 1 comprises three sub pixels. In order for the three sub pixels to be distinguished, they are filled with different hatch lines as shown in FIG. 4. Each pixel unit 1 comprises a first color sub pixel 11, a second color sub pixel 12, and a third color sub pixel 13 from left to right.

As shown in FIG. 4, two adjacent pixel unit rows are staggered with respect to each other for a distance of one sub pixel. In this case, a first color sub pixel 11 of a second pixel unit row is in the same column as a second color sub pixel 12 of a first pixel unit row, a second color sub pixel 12 of the second pixel unit row is in the same column as a third color sub pixel 13 of the first pixel unit row, and a third color sub pixel 13 of the second pixel unit row is in the same column as a first color sub pixel 11 of another pixel unit 1 of the first pixel unit row.

With reference to FIG. 2 and FIG. 4 together, it can be seen that a second column of sub pixels and a fourth column of sub pixels in FIG. 4 are undercharged, therefore have relatively low brightness, while a third column of sub pixels between the second and the fourth columns are fully charged, therefore have relatively high brightness. The second column of sub pixels with relatively low brightness comprises both a second color sub pixel 12 and a first color sub pixel 11, the third column of sub pixels comprises both a third color sub pixel 13 and a second color sub pixel 12, and the fourth column of sub pixels comprises both a first color sub pixel 11 and a third color sub pixel 13.

The specific charging effect is as shown in FIG. 5. The second color sub pixel 12 of the second column of sub pixels has relatively high brightness, which can be neutralized with the light from the second color sub pixel 12 of the third column of sub pixels, which has relatively low brightness. Similarly, light from the third color sub pixel 13 of the third column of sub pixels can be neutralized with light from the third color sub pixel 13 of the fourth column of sub pixels, and light from the first color sub pixel 11 of the fourth column of sub pixels can be neutralized with light from the first color sub pixel 11 of the next column of sub pixels. As a result, light of all colors from two longitudinally adjacent pixel units 1 can be neutralized with one another, whereby the liquid crystal display panel can display more uniform brightness as a whole.

While light of all colors from two longitudinally adjacent pixel units 1 can be neutralized, as to the liquid crystal display panel as shown in FIG. 4, light of all colors from two horizontally adjacent pixel units 1 can also be neutralized with one another. Specifically, a first pixel unit row is taken as an example. A first color sub pixel 11 is driven by an even numbered gate line G2, and has relatively high brightness. A second first color sub pixel 11 is driven by an odd numbered gate line G1, and has relatively low brightness. In this case, light from the first color sub pixel 11 can be neutralized with light from the second first color sub pixel 11. The same can be applied to the second color sub pixel 12 and the third color sub pixel 13. As a result, light of all colors from two horizontally adjacent pixel units 1 can be neutralized with one another.

Because light of all colors from both the two longitudinally adjacent pixel units 1 and the two horizontally adjacent pixel units 1 can be mutually neutralized, the entire liquid crystal display panel can appear to a user to have uniform brightness and be free from the defect of dark lines and bright lines. As a result, the liquid crystal display panel can have a favorable display effect.

In order for two adjacent pixel unit rows to be staggered relative to each other for a distance of one sub pixel, a structure as shown in FIG. 4 is adopted. In each cycle, every two continuous pixel unit rows form a cycle, and the first pixel unit row comprises no dummy sub pixel 2 at a left side thereof, and a first sub pixel at a left side of the second pixel unit row is a dummy sub pixel 2.

The dummy pixel 2 is a sub pixel which is not subject to the influence of a signal transmitted through the gate line and the data line, and thus always emits zero amount of light. Actually, a first sub pixel at a left side of every other row can be darkened, i.e., a gate line or gate is made conductive to a pixel electrode of said first sub pixel through welding process, so that a pixel voltage is provided to force the liquid crystals to deflect, thereby the sub pixel can always stay at a darkened state. Although the dummy sub pixel does not participate in the adjustment of light from a backlight, color filter layer is still formed corresponding to the dummy sub pixel 2, so that the manufacturing of a color filter substrate can be facilitated. It should only be noted that the color of the color filter layer corresponding to the dummy sub pixel 2 should be configured such that sub pixels of a same color in two longitudinally adjacent pixel units 1 are in different columns.

For example, as shown in FIG. 4, a color filter layer of a dummy sub pixel 2 of a second pixel unit row is the same as that of a third color sub pixel 13. A first color sub pixel 11 is disposed adjacent to the dummy sub pixel 2, so that a first color sub pixel 11 in a pixel unit 1 at a furthest left side of the second row can be staggered relative to a first color sub pixel 11 in a pixel unit 1 at a furthest left side of the first row. In this case, the first color sub pixel 11 in the first row and that in the second row are located in different columns.

Correspondingly, if the arrangement of sub pixels as shown in FIG. 4 is adopted, a first sub pixel at a right side of the first sub pixel row is a dummy sub pixel 2, and the second pixel unit row comprises no dummy sub pixel at a right side thereof. By arranging the dummy sub pixel 2 at the right side of the first pixel unit row, not only the number of sub pixels in each row of the entire liquid crystal display panel can be the same, the number of sub pixels in each row that participate in display can also be the same. As a result, the manufacturing of the liquid crystal display panel can be facilitated.

In addition, in order for sub pixels of the same color in two longitudinally adjacent pixel units to be located in different columns, in an example according to the present disclosure, the liquid crystal panel can also have the following structure.

As shown in FIG. 6, every three continuous pixel unit rows form a cycle. In each cycle, a second pixel unit row is staggered to the right relative to a first pixel unit row for a distance of one sub pixel, and a third pixel unit row is staggered to the right relative to the second pixel unit row for a distance of one sub pixel.

Based on the foregoing, sub pixels in two adjacent columns have different brightness. According to a drive waveform as shown in FIG. 2, the charging effect is as shown in FIG. 7. With a structure as shown in FIG. 6, longitudinally adjacent sub pixels of the same color can present different brightness in a manner of bright-dark-bright or dark-bright-dark in each cycle, i.e., three continuous pixel unit rows. Obviously, by arranging the structure as shown in FIG. 6, sub pixels of the same color, but with different brightness, can display a neutralized effect.

Similarly, as shown in FIG. 6, in order for sub pixels of the same color in the three continuous pixel unit rows to be staggered with respect to one another, the structure can be arranged in the following manner.

The first pixel unit row comprises no dummy sub pixel 2 at a left side thereof, a first sub pixel at a left side of the second pixel unit row is a dummy sub pixel 2, and both a first sub pixel and a second sub pixel at a left side of the third pixel unit row are dummy sub pixels 2.

Correspondingly, both the first sub pixel and a second sub pixel at the right side of the first pixel unit row are dummy sub pixels 2, a first sub pixel at a right side of the second pixel unit row is a dummy sub pixel 2, and the third pixel unit row comprises no dummy sub pixel 2 at a right side thereof.

It should be noted that in an example according to the present disclosure, dummy sub pixels 2 can be configured in different manners in different rows, so that sub pixels of the same color in two longitudinally adjacent pixel units can have different brightness under the same gray scale. However, in practical situation, each row can comprise two dummy sub pixels at most at an end thereof, or else the image displayed on the liquid crystal display panel will distort, and the degree of user experience will be reduced.

In an example according to the present disclosure, preferably, the sub pixels in a same pixel unit are respectively red, green, and blue from left to right. The structure of a pixel unit comprising a red sub pixel, a green sub pixel, and a blue sub pixel is the most mature and the most widely applied structure of pixel unit, which can reduce the production cost and enhance the application range of the present disclosure.

Further, a display device is further provided according to an example of the present disclosure, comprising the above-mentioned liquid crystal display panel. The display device can be liquid crystal television, liquid crystal display device, cell phone, and tablet PC, and the like.

The above embodiments are described only for better understanding, rather than restricting, the present disclosure. Any person skilled in the art can make amendments to the implementing forms or details without departing from the spirit and scope of the present disclosure. The scope of the present disclosure should still be subjected to the scope defined in the claims.

LIST OF REFERENCE SIGNS

1: pixel unit
11: first color sub pixel
12: second color sub pixel
13: third color sub pixel
2: dummy sub pixel

The invention claimed is:

1. A liquid crystal display panel, comprising a plurality of pixel units arranged as an array, wherein each pixel unit comprises at least three sub pixels respectively of different colors, and sub pixels of a same color in two longitudinally adjacent pixel units have different brightness under a same gray scale,
   wherein sub pixels of the same color in two longitudinally adjacent pixel units are disposed in different columns, and
   wherein every three continuous pixel unit rows form a cycle, in which a second pixel unit row is staggered to the right relative to a first pixel unit row for a distance of one sub pixel, and a third pixel unit row is staggered to the right relative to the second pixel unit row for a distance of one sub pixel.

2. The liquid crystal display panel according to claim 1, wherein the first pixel unit row comprises no dummy sub pixel at the left side thereof, the first sub pixel at the left side of the second pixel unit row is a dummy sub pixel, and both a first sub pixel and a second sub pixel at a left side of the third pixel unit row are dummy sub pixels.

3. The liquid crystal display panel according to claim 2, wherein both the first sub pixel and a second sub pixel at the right side of the first pixel unit row are dummy sub pixels, a first sub pixel at a right side of the second pixel unit row is a dummy sub pixel, and the third pixel unit row comprises no dummy sub pixel at a right side thereof.

4. The liquid crystal display panel according to claim 1, wherein the sub pixels in a same pixel unit are respectively red, green, and blue from left to right.

5. A display device comprising a liquid crystal display panel, wherein the liquid crystal display panel comprises a plurality of pixel units arranged as an array, wherein, each pixel unit comprises at least three sub pixels respectively of different colors, and sub pixels of a same color in two longitudinally adjacent pixel units have different brightness under a same gray scale, wherein sub pixels of the same color in two longitudinally adjacent pixel units are disposed in different columns, and wherein every three continuous pixel unit rows form a cycle, in which a second pixel unit row is staggered to the right relative to a first pixel unit row for a distance of one sub pixel, and a third pixel unit row is staggered to the right relative to the second pixel unit row for a distance of one sub pixel.

6. The display device according to claim 5, wherein the first pixel unit row comprises no dummy sub pixel at the left side thereof, the first sub pixel at the left side of the second pixel unit row is a dummy sub pixel, and both a first sub pixel and a second sub pixel at a left side of the third pixel unit row are dummy sub pixels.

7. The display device according to claim 6, wherein both the first sub pixel and a second sub pixel at the right side of the first pixel unit row are dummy sub pixels, a first sub pixel at a right side of the second pixel unit row is a dummy sub pixel, and the third pixel unit row comprises no dummy sub pixel at a right side thereof.

8. The display device according to claim 5, wherein the sub pixels in a same pixel unit are respectively red, green, and blue from left to right.

\* \* \* \* \*